US009487639B2

(12) United States Patent
Tagai et al.

(10) Patent No.: US 9,487,639 B2
(45) Date of Patent: Nov. 8, 2016

(54) HEAT CURABLE SILICONE RUBBER COMPOSITION

(71) Applicant: Momentive Performance Materials Japan LLC, Minato-ku, Tokyo (JP)

(72) Inventors: Hidefumi Tagai, Tokyo (JP); Hiroyoshi Iijima, Tokyo (JP); Hideo Takahashi, Tokyo (JP)

(73) Assignee: MOMENTIVE PERFORMANCE MATERIALS JAPAN LLC, Minato-ku, Tokyo (JP)

( * ) Notice: Subject to any disclaimer, the term of this patent is extended or adjusted under 35 U.S.C. 154(b) by 0 days.

(21) Appl. No.: 14/438,103

(22) PCT Filed: Nov. 1, 2013

(86) PCT No.: PCT/JP2013/079693
§ 371 (c)(1),
(2) Date: Apr. 23, 2015

(87) PCT Pub. No.: WO2014/069621
PCT Pub. Date: May 8, 2014

(65) Prior Publication Data
US 2015/0291766 A1 Oct. 15, 2015

(30) Foreign Application Priority Data

Nov. 5, 2012 (JP) .................................. 2012-243428

(51) Int. Cl.
C08K 3/36 (2006.01)
C08K 5/43 (2006.01)
C08L 83/04 (2006.01)
C08J 3/24 (2006.01)
C08K 9/04 (2006.01)
C08G 77/14 (2006.01)

(52) U.S. Cl.
CPC ................. *C08K 3/36* (2013.01); *C08G 77/14* (2013.01); *C08J 3/242* (2013.01); *C08K 5/43* (2013.01); *C08K 9/04* (2013.01); *C08L 83/04* (2013.01); *C08J 2383/04* (2013.01)

(58) Field of Classification Search
CPC ........... C08G 77/20; C08K 3/36; C08K 5/43
See application file for complete search history.

(56) References Cited

U.S. PATENT DOCUMENTS

| 8,779,072 B2 | 7/2014 | Iijima et al. |
| 2008/0076864 A1 | 3/2008 | Mogi |
| 2009/0062499 A1 | 3/2009 | Mogi |
| 2011/0039991 A1* | 2/2011 | Iijima .................... C08G 77/04 524/99 |

FOREIGN PATENT DOCUMENTS

| JP | 2005-298661 A | 10/2005 |
| JP | 2005-344102 A | 12/2005 |
| JP | 2006-083211 A | 3/2006 |
| JP | 2006-225422 A | 8/2006 |
| JP | 2009-173922 A | 8/2009 |
| JP | 2011-021105 A | 2/2011 |
| JP | 2011-201951 A | 10/2011 |
| WO | WO 2009/084730 A1 | 7/2009 |
| WO | WO 2009/084733 A1 | 7/2009 |

OTHER PUBLICATIONS

Translation of International Preliminary Report on Patentability issued in Application No. PCT/JP2013/079693 dated May 5, 2015 (1 page).
Translation of Written Opinion of the International Searching Authority issued in Application No. PCT/JP2013/079693 dated Nov. 26, 2013 (3 pages).
English-language International Search Report for PCT/JP2013/079693 (2 pages).
Extended European Patent Office Search Report dated May 17, 2016 (9 pages).

* cited by examiner

*Primary Examiner* — Kuo-Liang Peng
(74) *Attorney, Agent, or Firm* — Flynn, Thiel, Boutell & Tanis, P.C.

(57) ABSTRACT

The present invention provides a heat-curable silicone rubber composition capable of giving a stable and high antistatic property for a long time without degrading inherent properties of a silicone rubber, such as thermal stability. The heat-curable silicone rubber composition includes: (A) 100 parts by mass of a mixture of a polyorganosiloxane obtained by polymerization by using an alkali metal hydroxide as a polymerization catalyst and by neutralization, and a curing agent, and (B) 50 to 1000 ppm of an ionic substance containing an anion and a cation, and being a bis(trifluoromethanesulfonyl)imide as the anion.

12 Claims, No Drawings

HEAT CURABLE SILICONE RUBBER COMPOSITION

TECHNICAL FIELD

The present invention relates to a heat-curable silicone rubber composition capable of providing a molded article having a high antistatic property, and a manufacturing method thereof.

BACKGROUND ART

Conventionally, in antistatic rubbers, there have been proposed compositions using a polyether-based compound as an antistatic agent (JP-B 62-15584).

However, the compositions using the polyether-based compounds have a problem in that the cured products thereof have a white turbidity because of a poor compatibility between the silicone polymer and the polyether-based antistatic agent.

Therefore, it is difficult to use the composition in silicone rubber materials used for: a cover of a portable music player, portable game, cellular phone, controller of a game playing device and the like; a silicone rubber mold used for producing a duplicate with a urethane resin and the like; silicone rubber coating on fabrics, and the like, all of which require a higher transparency in the use thereof.

Furthermore, the compositions using the polyether-based compound also have a problem in that the polyether-based compound thermally decomposes at a high temperature, and thus sufficient antistatic effects cannot be exhibited.

In addition, a manufacturing method of heat-curable silicone rubbers has, for example, a post-curing process for 4 hours at 200° C. after a primary curing process, in order to further accelerate the removal of decomposed products of the curing agent or the curing.

There has been proposed that a lithium salt is blended as shown in JP-A 2006-225422 as a technique for imparting a high heat resistance.

It is important for the antistatic products to exhibit antistatic effects on their surfaces, but since the lithium salt is in a state of a solid or powder, there is a problem in which it takes time until the lithium salt exhibits the antistatic effect. Furthermore, the lithium salt has a quality problem in which differences in the dispersion state are easily caused and in which a stable quality is unlikely to be obtained. Therefore, although this problem can be avoided by increasing its amount to be added, there occurs a problem in which the heat resistance and compression set property which the silicone rubber inherently has are remarkably deteriorated.

It has been numerously proposed that an ionic liquid is added to a rubber/plastic composition. Examples of addition to the silicone rubber are in JP-A 2005-298661 and JP-A 2006-83211.

However, a dimethyl silicone polymer is non-polar and has a low solubility constant (SP value) of 14.9 $(MPa)^{1/2}$, and thus has a low compatibility with the ionic liquid which has an excellent compatibility with a polymer having a high SP value, such as urethane, epichlorohydrin, acrylonitrile butadiene or chloroprene. Therefore, it is difficult to stably add the ionic liquid to the silicone rubber. Even if the ionic liquid is added to the silicone rubber, most thereof bleeds immediately on the surface of the rubber, and the effect cannot be maintained.

Furthermore, in the proposals described above, the addition of the ionic liquid to the silicone rubber is not the addition to the heat-curable silicone rubber, but to a condensation curable system in which room-temperature curing is carried out.

There has been known an ion-conductive rubber composition in which a polyether-modified organohydrgenpolysiloxane and an ion-conductive compound are added to a polyorganopolysiloxane (JP-A 2005-344102).

However, with respect to this composition, the combination with the polyether-modified organohydrgenpolysiloxane is essential and is limited to addition reaction. In addition, there is no description of a polymerization method of the organopolysiloxane.

As the method to solve these problems, there has been proposed in WO-A1 2009/084730 and WO-A1 2009/084733 a method in which a very small amount of a specific ionic substance is added to a heat-curable silicone rubber. However, when increasing the blending amount of the specific ionic substance in order to obtain a higher antistatic property, although the antistatic property is reliably enhanced, there is a case where the inherent properties of the silicone rubber cannot be maintained, for example, a problem of degrading heat-resistance or the like is caused.

In JP-A 2011-201951, there is described a silicone rubber composition including (A) an organopolysiloxane having at least two alkenyl groups in one molecule, (B) a reinforcing filler, (C) an ion-conductive antistatic agent, (D) an alkali metal hydroxide, or the like, (E) an organoperoxide curing agent.

In the composition, there is no description of a polymerization method of the component (A), and since the alkali metal hydroxide (KOH in Example 1) is contained as the (D) component, there is a risk that the polymer chain is cleaved.

SUMMARY OF THE INVENTION

The present invention solves the above-mentioned conventional problems, and an object of the present invention is to provide a heat-curable silicone rubber composition which can give an antistatic property stably for a long time to a silicone polymer having a poor compatibility with an ionic substance serving as an antistatic component, and which has a high antistatic property without degrading inherent properties such as appearance (no change of color) and thermal stability, even when the ionic substance such as an ionic liquid is added in a larger amount than conventional amount in order to obtain an excellent antistatic property, and to provide a manufacturing method thereof.

The present inventors have found that the silicone rubber component has a high antistatic property and can maintain inherent properties such as appearance (no change of color) and thermal stability, by using, as the base polymer, a silicone polymer polymerized through the use of an alkali metal hydroxide catalyst, and have completed the present invention.

The present invention provides a heat-curable silicone rubber composition including:
(A) 100 parts by mass of a mixture of a polyorganosiloxane obtained by polymerization by using an alkali metal hydroxide as a polymerization catalyst and by neutralization by using an acid, and a curing agent, and
(B) 50 to 1000 ppm of an ionic substance containing an anion and a cation, and being a bis(trifluoromethanesulfonyl)imide anion as the anion, and provides a manufacturing method thereof.

The present invention provides an antistatic silicone rubber cured product obtained by curing the above-mentioned silicone runner composition.

According to the composition of the present invention, it is possible to give stable antistatic property for a long time to a silicone polymer having a poor compatibility with an ionic substance serving as an antistatic component, and to give a high antistatic property without degrading inherent properties such as appearance (no change of color) and thermal stability.

DETAILED DESCRIPTION OF THE INVENTION

<Heat-Curable Silicone Rubber Composition>

Component (A)

The polyorganosiloxane contained in the component (A) as a base polymer is one obtained by being polymerized through the use of an alkali metal polymerization catalyst, and neutralized.

There are disclosed cesium hydroxide, rubidium hydroxide, potassium hydroxide and sodium hydroxide, as an alkali metal hydroxide used as the polymerization catalyst.

The polymerization method of the polyorganosiloxane serving as the base polymer can be carried out by using the alkali metal hydroxide as the polymerization catalyst, in the following manner.

Explanation in the case of a batch-type polymerization method will be given.

A siloxane monomer, for example, dimethyl tetramer (octamethylcyclotetrapolysiloxane) and a chain stopper are introduced into a polymerization container, and are then dried by performing distillation or circulating a siloxane steam through a molecular sieve column.

Next, after heating the dried siloxane monomer to about 155° C., the polymerization reaction is advanced under stirring by the addition of potassium hydroxide as the polymerization catalyst, in the form of a crushed slurry of the methyl tetramer.

With the progress of the polymerization reaction, the addition of the monomers to the end of the polymer chain forms a long polymer.

In this way, at the time when the polymerization progresses and a siloxane polymer having a desired viscosity is obtained, the polymerization reaction is terminated by neutralization of the potassium hydroxide added as the polymerization catalyst through the use of a neutralizing agent, for example, phosphoric acid.

Finally, the polyorganosiloxane serving as the base polymer of the component (A) can be obtained by separating and removing the unreacted monomer through distillation.

Note that, as the polymerization method of a polyorganosiloxane used in a silicone rubber composition, there is known a polymerization method of a cyclic siloxane by using an alkali catalyst (thermally decomposable type basic catalyst), and although there is used, as the thermally decomposable type basic catalyst, tetramethylammonium hydroxide, tetraethylammonium hydroxide, tetrapropylammonium hydroxide, tetrabutylammonium hydroxide; tetramethylammonium silanolate obtained by silanolating thereof, or the like, these alkali catalysts (thermally decomposable type basic catalyst) are not included in the alkali metal polymerization catalyst used in the component (A) of the present invention.

The polyorganosiloxane serving as the base polymer has a substituted or non-substituted, monovalent hydrocarbon group as an organic group which bonds to a silicon atom, and examples thereof include a non-substituted hydrocarbon group such as: an alkyl group including methyl, ethyl, propyl, butyl, hexyl or dodecyl; an aryl group including phenyl; or an aralkyl group including β-phenylethyl or β-phenylpropyl; and a substituted hydrocarbon group such as: chloromethyl or 3,3,3-trifluoropropyl; and methyl or phenyl is preferable.

The polyorganosiloxane serving as the base polymer is preferably a polydiorganosilixane in which at least two organic groups of organic groups bound to a silicon atom in one molecule are vinyl groups, and, particularly, a linear one is preferable, but is not limiting, and a polyorganosiloxane having no vinyl group, or a branched or cyclic polyorganosiloxane can also be used.

The component (A) contains a curing agent. As the curing agent, there can be used a curing agent when applying a crosslinking reaction due to a well-known organic peroxide or a crosslinking reaction due to an addition reaction.

Examples of the curing agent when applying a crosslinking reaction of an organic peroxide include curing agents of various organic peroxides such as benzoyl peroxide, 2,4-dichlorobenzoyl peroxide, p-methylbenzoyl peroxide, o-methylbenzoyl peroxide, dicumyl peroxide, cumyl-t-butyl peroxide, 2,5-dimethyl-2,5-di-t-butyl peroxyhexane and di-t-butyl peroxide.

Particularly, dicumyl peroxide, cumyl-t-butyl peroxide, 2,5-dimethyl-2,5-di-t-butyl peroxyhexane, and di-t-butyl peroxide are preferable because they give a low compression set.

The organic peroxide curing agent can be used as one or more kinds of mixtures.

The blending amount of the organic peroxide serving as the curing agent is preferably 0.05 to 10 parts by mass relative to 100 parts by mass of the silicone base polymer, more preferably 0.1 to 2.0 parts by mass.

With respect to a curing agent used when applying the crosslinking reaction due to an addition reaction, a platinum-based catalyst such as chloroplatinic acid, platinum olefin complex, platinum vinyl siloxane complex, platinum black or platinum triphenylphosphine complex is used as a curing catalyst, and a polydiorganosiloxane in which the number of hydrogen atoms bound to a silicon atom is larger than 2 on average in one molecule is used as a crosslinking agent.

The blending amount of the curing catalyst is preferably 0.1 to 1000 ppm relative to the silicone base polymer in terms of the amount of platinum element, preferably 0.5 to 100 ppm, and more preferably 1 to 50 ppm. The blending amount of the curing catalyst is preferably within the above-mentioned amount in terms of the amount of platinum element because the curing sufficiently proceeds.

The blending amount of the crosslinking agent is preferably an amount such that the number of hydrogen atoms bound to a silicon atom in the crosslinking agent is 0.5 to 4.0 per alkenyl group in the silicone base polymer, more preferably an amount such that the number is 1.0 to 3.0. When the number of the hydrogen atoms is 0.5 or more, the curing of the composition sufficiently proceeds, and thus the hardness of the cured composition becomes high, whereas when the number of the hydrogen atoms is 4.0 or less, the physical properties and the heat resistance of the cured composition are enhanced.

Furthermore as necessary, additives such as filler, pigment, heat-resistance improver, flame retardant, and the like can be blended into the component (A), and particularly, a reinforcing silica is preferably blended as the filler.

Examples of the reinforcing silica can include dry silica such as aerosol silica or arc silica; wet silica such as precipitated silica or silica aerogel; hydrophobic silica obtained by treating the silica described above with an organic silicon compound such as hexamethyldisilazane, trimethylchlorosilane, dimethyldichlorosilane, trimethylmethoxysilane or octamethylcyclotetrasiloxane, and the like, and among them, the aerosol silica and the hydrophobized silica thereof are preferable.

In order to obtain an excellent reinforcing effect, reinforcing silica normally having a specific surface area of 50 m$^2$/g or more is preferable, more preferably 100 to 700 m$^2$/g, and further more preferably 130 to 500 m$^2$/g.

When blending the reinforcing silica, the blending amount is preferably 5 to 100 parts by mass relative to 100 parts by mass of the silicone base polymer, more preferably 10 to 80 parts by mass, and further more preferably 20 to 50 parts by mass.

There can be blended, as the other filler, pulverized quartz powder, clay, calcium carbonate, diatomaceous earth, titanium dioxide, and the like.

Examples of the heat-resistance improver can include iron oxide, cerium oxide, cerium hydroxide, iron octylate, and the like.

In addition, it is also possible to blend saturated aliphatic hydrocarbons such as isoparaffin; releasing agents such as metal salts of fatty acid and fatty acid amides; foaming agents such as azodicarbonamide and azobisisobutyronitrile; and the like.

Furthermore, it is possible to blend well-known organic silicon compounds, surfactants or processing aids in order to improve the dispersibility of a filler such as reinforcing silica.

<Component (B)>

The component (B) is an ionic substance including an anion component and a cation component, and contains a bis(trifluoromethanesulfonyl)imide anion as the anion component.

There are known, as the anion of the ionic substance, numerous anions such as an alkyl sulfate-based anion, a tosylate anion, a sulfonate-based anion, bis(trifluoromethanesulfonyl)imide anion, bis(fluorosulfonyl)imide anion, hexafluorophosphate anion, tetrafluoroborate anion, a halide anion, and the like, but in the present invention, it becomes necessary to use the ionic substance which contains the bis(trifluoromethanesulfonyl)imide anion, in order to achieve the purpose of the present application.

Examples of the cation of the ionic substance are lithium cation, an imidazolium-based cation use for an ionic liquid, a pyrrolidinium-based cation, a pyridinium-based cation, an ammonium-based cation, a phosphonium-based cation, a sulfonium-based cation, and the like. Particularly in the present invention, the imidazolium-based cation, the pyrrolidinium-based cation, the pyridinium-based cation, the ammonium-based cation, and the lithium cation are preferable.

Specific examples of the ionic substance can include 1-butyl-1-methylpyrrolidinium.bis(trifluoromethanesulfonyl)imide, 1-methyl-1propylpyrrolidinium.bis-(trifluoromethanesulfonyl)imide, 3-methyl-1-propylpyridinium.bis(trifluoromethanesulfonyl)imide, N-butyl-3-methylpyridinium.bis(trifluoromethanesulfonyl)imide, 1-methyl-1propylpyridinium.bis(trifluoromethanesulfonyl)imide, diallyldimethylammonium.bis(trifluoromethanesulfonyl)imide, methyltrioctylammonium.bis(trifluoromethanesulfonyl)imide, 1-butyl-3-methylimidazolium.bis(trifluoromethanesulfonyl)imide, 1,2-dimethyl-3-propylimidazolium.bis-(trifluoromethanesulfonyl)imide, 1-ethyl-3-methylimidazolium.bis(trifluoromethanesulfonyl)imide, 1-vinylimidazolium.bis(trifluoromethanesulfonyl)imide, 1-allylimidazolium.bis(trifluoromethanesulfonyl)imide, 1-allyl-3-methylimidazolium.bis(trifluoromethanesulfonyl)imide, lithium.bis(trifluoromethanesulfonyl)imide, and the like.

Note that the ionic liquid used in the present invention is not limited to those exemplified above.

The blending amount (on a mass basis) of the component (B) is 50 to 1000 ppm relative to 100 parts by mass of the component (A), preferably 70 to 700 ppm, and more preferably 100 to 500 ppm.

When the blending amount of the component (B) is less than 50 ppm, there is a problem in which the antistatic property is not enough, and even when blending an amount larger than 1000 ppm, there is a problem in which not only the effect is saturated but also commercial disadvantages are caused.

The molded article obtained from the heat curable silicone rubber composition of the present invention can add the ionic substance as the antistatic agent in a larger amount than the conventional amount, and since the molded article not only maintains the excellent antistatic property, but also has excellent appearance (no color change) and heat-resistance which the silicone rubber inherently has, the article is suitably used for: a cover of portable music player, portable game, cellular phone, controller of game playing device and the like; a silicone rubber mold used for producing a duplicate with a urethane resin and the like; silicone rubber coating on fabrics, and the like.

<Manufacturing Method of Heat-Curable Silicone Rubber Composition>

The composition of the present invention can be manufactured by mixing the component (A) and the component (B), and other components blended as necessary.

Furthermore, according to the composition of the present invention, in order to more uniformly mix the component (A) and the component (B) and to maintain the antistatic property stably for a long time, it is preferable to employ a method of mixing the ionic substance of the component (B) and the filler containing the reinforcing silica to thereby carry the ionic substance on the filler, and then mixing the resultant mixture with the component (A).

The filler containing the reinforcing silica may be the reinforcing silica alone or may be a mixture of the reinforcing silica and other filler. In the case of the mixture of the reinforcing silica and other filler, it is preferable that a proportion of the reinforcing silica is 50% by mass or more.

The use amount of the filler containing the reinforcing silica is extremely smaller than the blending amount when blending the filler containing the reinforcing silica as the component (A), since the blending amount of the ionic substance of the component (B) in the composition is very small. Accordingly, even when the filler containing the reinforcing silica is used in the manufacturing processes, the use amount is negligible in comparison with the blending amount of the filler containing the reinforcing silica as the component (A).

The use amount of the filler containing the reinforcing silica is preferably 0.005 to 1 part by mass relative to the base polymer of the component (A), more preferably 0.01 to 0.5 parts by mass.

EXAMPLES

The following Examples describe the working of the present invention are explained. The Examples describe exemplification of the present invention, and the present invention is not limited thereby.

Hereinafter, "part" means "part by mass", and ppm means a mass basis.

Manufacturing Example 1

2000 g of octamethylcyclotetrasiloxane (TSF404, manufactured by MOMENTIVE PERFORMANCE MATERIALS JAPAN) and 25 g of 2,4,6,8-tetramethyl-2,4,6,8-tetravinylcyclotetrasiloxane and a required amount of a linear polydimethylsiloxane serving as a chain stopper were mixed in a four-necked flask of 5000 milliliters to which a stirring device, a condenser, a nitrogen introduction tube, a thermometer and a pressure-reducing device were attached, and then 1.0 g of KOH (potassium hydroxide) ground by a mortar was charged into the resultant mixture.

While maintaining the reaction temperature at 150° C.±1° C., an equilibration reaction was carried out for 5 hours. After the completion of the reaction, a neutralization reaction was carried out through the use of phosphoric acid. After that, 1600 g of a colorless transparent liquid was obtained by distilling away an unreacted hexamethylcyclotrisilxane and low molecular weight contaminants from the reaction solution under the condition of 0.1 kPa for 2 hours.

Example 1

30 Parts of a dry silica (manufactured by NIPPON AEROSIL) having a specific surface area of 150 m$^2$/g and 3 parts of polydimethylsiloxane having a silanol group at a terminal (average polymerization degree of 10) were mixed into 100 parts of a vinyl group-containing polyorganosiloxane having 0.20% by mole of methylvinylsiloxane unit and a polymerization degree of 5000 and obtained in Manufacturing Example 1, were then heated at 150° C. for 2 hours to thereby give a silicone base compound serving as the component (A).

Next, 240 ppm of 1-butyl-3-methylpyridinium.bis-(trifluoromethanesulfonyl)imide of the component (B) which is a liquid at normal temperatures, and a dry silica (manufactured by NIPPON AEROSIL) having a specific surface area of 150 m$^2$/g were mixed with each other so as to produce 0.2 part relative to 100 parts of the base compound of the component (A), and thus the ionic liquid of the component (B) was carried on the dry silica. Subsequently, the resultant mixture was added to and mixed with the base compound of the component (A).

After that, 0.5 part of an addition-type curing agent TC-25A (curing catalyst) and 2.0 parts of TC-25B (cross-linking agent)(manufactured by MOMENTIVE PERFORMANCE MATERIALS JAPAN) were blended, and were press-cured at 170° C. for 10 minutes to thereby give a rubber test piece for the evaluation of its properties.

Example 2

240 ppm of 1-butyl-1-methylpyridinium.bis-(trifluoromethanesulfonyl)imide of the component (B) which is a liquid at normal temperatures, and a dry silica (manufactured by NIPPON AEROSIL) having a specific surface area of 150 m$^2$/g were mixed with each other so as to produce 0.2 part relative to 100 parts of the base compound of the component (A) of Example 1, and thus the ionic liquid of the component (B) was carried on the dry silica. Subsequently, the resultant mixture was added to and mixed with the base compound of the component (A). After that, the same evaluations as those in Example 1 were carried out.

Example 3

240 ppm of diallyldimethylammonium.bis-(trifluoromethanesulfonyl)imide which is a liquid at normal temperatures, and a dry silica (manufactured by NIPPON AEROSIL) having a specific surface area of 150 m$^2$/g were mixed with each other so as to produce 0.2 part relative to 100 parts of the base compound of the component (A) of Example 1, and thus the ionic liquid of the component (B) was carried on the dry silica. Subsequently, the resultant mixture was added to and mixed with the base compound of the component (A). After that, the same evaluations as those in Example 1 were carried out.

Example 4

480 ppm of a 50% aqueous solution of lithium.bis(trifluoromethanesulfonyl)imide which is a solid at normal temperatures (240 ppm as lithium.bis-(trifluoromethanesulfonyl)imide), and a dry silica (manufactured by NIPPON AEROSIL) having a specific surface area of 150 m$^2$/g were mixed with each other so as to produce 0.2 part relative to 100 parts of the base compound of the component (A) of Example 1, and thus the ionic liquid of the component (B) was carried on the dry silica. Subsequently, the resultant mixture was added to and mixed with the base compound of the component (A). After that, the same evaluations as those in Example 1 were carried out.

Example 5

500 ppm of 1-methyl-1-propylpyrrolidinium.bis-(trifluoromethanesulfonyl)imide which is a liquid at normal temperatures, and a dry silica (manufactured by NIPPON AEROSIL) having a specific surface area of 150 m$^2$/g were mixed with each other so as to produce 0.4 part relative to 100 parts of the base compound of the component (A) of Example 1, and thus the ionic liquid of the component (B) was carried on the dry silica. Subsequently, the resultant mixture was added to and mixed with the base compound of the component (A). After that, the same evaluations as those in Example 1 were carried out.

Example 6

100 ppm of 1-methyl-1-propylpyridinium.bis-(trifluoromethanesulfonyl)imide which is a liquid at normal temperatures, and a dry silica (manufactured by NIPPON AEROSIL) having a specific surface area of 150 m$^2$/g were mixed with each other so as to produce 0.2 part relative to 100 parts of the base compound of the component (A) of Example 1, and thus the ionic liquid of the component (B) was carried on the dry silica. Subsequently, the resultant mixture was added to and mixed with the base compound of the component (A). After that, the same evaluations as those in Example 1 were carried out.

Example 7

100 ppm of methyltrioctylammonium.bis-(trifluoromethanesulfonyl)imide which is a liquid at normal temperatures, and a dry silica (manufactured by NIPPON AEROSIL) having a specific surface area of 150 m$^2$/g were mixed with each other so as to produce 0.2 part relative to 100 parts of the base compound of the component (A) of Example 1, and thus the ionic liquid of the component (B) was carried on the dry silica. Subsequently, the resultant mixture was added to and mixed with the base compound of the component (A). After that, the same evaluations as those in Example 1 were carried out.

Manufacturing Example 2

2000 g of octamethylcyclotetrasiloxane (TSF404, manufactured by MOMENTIVE PERFORMANCE MATERIALS JAPAN) and 25 g of 2,4,6,8-tetramethyl-2,4,6,8-tetravinylcyclotetrasiloxane and a required amount of a linear polydimethylsiloxane serving as a chain stopper were mixed in a four-necked flask of 5000 milliliters to which a stirring device, a condenser, a nitrogen introduction tube, a thermometer and a pressure-reducing device were attached, and then 1.0 g of tetraammonium silanolate was charged into the resultant mixture.

While maintaining the reaction temperature at 90° C.±1° C., an equilibration reaction was carried out for 5 hours. After the completion of the reaction, the reaction solution was heated to 150° C. and the thermally decomposable catalyst was sufficiently deactivated. After that, 1600 g of a colorless transparent liquid was obtained by distilling away an unreacted hexamethylcyclotrisilxane and low-molecular-weight contaminants from the reaction solution under the condition of 0.1 kPa for 2 hours.

Comparative Example 1

A silicone rubber composition was obtained in the same way as in Example 1 except that there was used a vinyl-containing polydimethylorganosiloxane having 0.20% by mole of methylvinylsiloxane unit and having a polymerization degree of 5000, obtained in Manufacturing Example 2 instead of the polymethylorganosiloxane obtained in Manufacturing Example 1. However, the addition amount of 1-butyl-3-methylprydinium.bis(trifluoromethanesulfonyl) imide was 5 ppm. After that, the same evaluations as those in Example 1 were carried out.

Comparative Example 2

A silicone rubber composition was obtained in the same way as in Example 1 except that there was used the polydimethylorganosiloxane obtained in Manufacturing Example 2 instead of the polymethylorganosiloxane obtained in Manufacturing Example 1. After that, the same evaluations as those in Example 1 were carried out.

Comparative Example 3

A silicone rubber composition was obtained in the same way as in Example 2 except that there was used the polydimethylorganosiloxane obtained in Manufacturing Example 2 instead of the polymethylorganosiloxane obtained in Manufacturing Example 1. After that, the same evaluations as those in Example 1 were carried out.

Comparative Example 4

A silicone rubber composition was obtained in the same way as in Example 3 except that there was used the polydimethylorganosiloxane obtained in Manufacturing Example 2 instead of the polymethylorganosiloxane obtained in Manufacturing Example 1. After that, the same evaluations as those in Example 1 were carried out.

Comparative Example 5

A silicone rubber composition was obtained in the same way as in Example 4 except that there was used the polydimethylorganosiloxane obtained in Manufacturing Example 2 instead of the polymethylorganosiloxane obtained in Manufacturing Example 1. After that, the same evaluations as those in Example 1 were carried out.

Comparative Example 6

A silicone rubber composition was obtained in the same way as in Example 1 except that there was used the polydimethylorganosiloxane obtained in Manufacturing Example 2 instead of the polymethylorganosiloxane obtained in Manufacturing Example 1. However, 1-butyl-3-methylprydinium.bis(trifluoromethanesulfonyl)imide was not added.

After that, the same evaluations as those in Example 1 were carried out.

Comparative Example 7

As in Example 1, 240 ppm of 1-butyl-3-methylprydinium.bis(trifluoromethanesulfonyl)imide of the component (B) was added to 100 parts of the base compound of the component (A). However, the component (B) was merely added to and mixed with the base component (A) without mixing the component (B) and the dry silica, i.e. without carrying the ionic liquid on the dry silica.

After that, a rubber sheet for environmental test was obtained as in Example 1.

The environmental test was carried out using the rubber sheets obtained in Comparative Example 7 and Example 1.

As a result, the charged voltage half-life of Example 1 was 0.2 second (initial value 0.1 second) and did not exhibit a large change, but the charged voltage half-life of Comparative Example 7 was 3.6 seconds (initial value 0.1 second) and exhibited a change.

Manufacturing Example 3

A colorless transparent liquid was obtained in the same way as in Manufacturing Example 1 except that CsOH (cesium hydroxide) was used instead of KOH (potassium hydroxide) of Example 1.

Example 8

A silicone rubber composition was obtained in completely the same way as in Example 1 except that there was used the polydimethylorganosiloxane obtained in Manufacturing Example 3 instead of the polymethylorganosiloxane obtained in Manufacturing Example 1. After that, the same evaluations as those in Example 1 were carried out.

The results in which the properties of the rubber sheet obtained were evaluated by the following standards are shown in Table 1.

Appearance

Evaluated with naked eyes.

Charged Voltage Half-Life

After a test piece was charged by 6 KV corona discharge, the time (seconds) when a charged voltage is reduced by half was measured through the use of a Static Honestmeter H-0110 manufactured by Shishido Electrostatic, Ltd.

Measurement of Rubber Properties

After producing a sheet, hardness was measured in accordance with JIS K 6249.

Heat Resistance Test

After performing vulcanization in an air-circulation oven at 200° C. for 4 hours, the change of hardness was observed. The symbol+shows an increase of hardness, and for example, "1" in Example 1 shows an increase of hardness by 1. Namely, a large change of hardness was not observed.

The symbol—shows a decrease of hardness, and for example, "−15" in Comparative Example 2 shows a decrease of hardness by 15. Namely, there was a large change of hardness, and the inherent hardness was not maintained.

Compression Set

A test piece was produced in accordance with JIS K 6249, and a test was carried out under the conditions at 25% compression, 180° C.×22 hours.

Environmental Test

An environmental test was carried out by using Sunshine Weather meter under the test conditions of JIS A 1439. The used test machine was Sunshine Super Long Life Weather meter (WEL-SUN Type) manufactured by Suga Test Instruments Co., Ltd., and after exposure for 2000 hours, a charged voltage half-life was measured.

TABLE 1

|   |   | Example 1 | Example 2 | Example 3 | Example 4 | Example 5 | Example 6 | Example 7 | Example 8 |
|---|---|---|---|---|---|---|---|---|---|
| (A) | Heat curable silicone rubber compound (KOH polymerization catalyst) | 100 | 100 | 100 | 100 | 100 | 100 | 100 | |
|  | Heat curable silicone rubber compound (TMAH polymerization catalyst) | | | | | | | | |
|  | Heat curable silicone rubber compound (ScOH polymerization catalyst) | | | | | | | | 100 |
| (B) | 1-Butyl-3-methylpyridinium-bis(trifluoromethanesulfonyl)imide ppm | 240 | | | | | | | 240 |
|  | 1-Butyl-1-methylpyrrolidinium-bis(trifluoromethanesulfonyl)imide ppm | | 240 | | | | | | |
|  | Diallyldimethylammonium-bis(trifluoromethanesulfonyl)imide ppm | | | 240 | | | | | |
|  | Lithium-bis(trifluoromethanesulfonyl)imide | | | | 240 | | | | |
|  | 1-Methyl-1-propylpyrrolidinium-bis(trifluoromethanesulfonyl)imide | | | | | 500 | | | |
|  | 1-Methyl-1-propylpyridinium-bis(trifluoromethanesulfonyl)imide | | | | | | 100 | | |
|  | Methyltrioctylammonium-bis(trifluoromethanesulfonyl)imide | | | | | | | 100 | |
| Evaluation results | Appearance | White translucent | White translucent | White translucent | White translucent | White translucent | White translucent | White translucent | White translucent |
|  | Charged Voltage Half-Life, sec. | 0.1 | 0.1 | 0.1 | 0.1 | 0.1 | 0.7 | 0.1 | 0.1 |
|  | Hardness, type A | 40 | 41 | 37 | 39 | 39 | 40 | 41 | 39 |
|  | Heat resistance Change of hardness, 200° C. × 4 hours after | 1 | 1 | 2 | 2 | 3 | 2 | 2 | 1 |
|  | Compression set, %, 25% compression, 180° C. × 22 hours | 39 | 41 | 38 | 44 | 43 | 40 | 41 | 41 |

|   |   | Comparative Example 1 | Comparative Example 2 | Comparative Example 3 | Comparative Example 4 | Comparative Example 5 | Comparative Example 6 |
|---|---|---|---|---|---|---|---|
| (A) | Heat curable silicone rubber compound (KOH polymerization catalyst) | | | | | | |
|  | Heat curable silicone rubber compound (TMAH polymerization catalyst) | 100 | 100 | 100 | 100 | 100 | 100 |
|  | Heat curable silicone rubber compound (ScOH polymerization catalyst) | | | | | | |
| (B) | 1-Butyl-3-methylpyridinium-bis(trifluoromethanesulfonyl)imide ppm | 5 | 240 | | | | |
|  | 1-Butyl-1-methylpyrrolidinium-bis(trifluoromethanesulfonyl)imide ppm | | | 240 | | | |
|  | Diallyldimethylammonium-bis(trifluoromethanesulfonyl)imide ppm | | | | 240 | | |
|  | Lithium-bis(trifluoromethanesulfonyl)imide | | | | | 240 | |
|  | 1-Methyl-1-propylpyrrolidinium-bis(trifluoromethanesulfonyl)imide | | | | | | |
|  | 1-Methyl-1-propylpyridinium-bis(trifluoromethanesulfonyl)imide | | | | | | |
|  | Methyltrioctylammonium-bis(trifluoromethanesulfonyl)imide | | | | | | |
| Evaluation results | Appearance | White translucent | Slightly yellow, translucent | Slightly yellow, translucent | White translucent | Slightly yellow, translucent | White translucent |
|  | Charged Voltage Half-Life, sec. | 21 | 0.1 | 0.1 | 0.1 | 0.1 | Not attenuated |
|  | Hardness, type A | 39 | 41 | 40 | 37 | 33 | 42 |

TABLE 1-continued

| | | | | | | |
|---|---|---|---|---|---|---|
| Heat resistance Change of hardness, 200° C. × 4 hours after | 2 | −15 | −13 | −11 | −18 | 2 |
| Compression set, %, 25% compression, 180° C. × 22 hours | 42 | 104 | 102 | 104 | 106 | 40 |

The heat-curable silicone rubber composition can be used as manufacturing raw materials for: a cover of portable music player, portable game, cellular phone, controller of game playing device and the like; a silicone rubber mold used for producing a duplicate with a urethane resin and the like; and silicone rubber coating on fabrics.

The invention claimed is:

1. A heat-curable silicone rubber composition comprising:
   (A) 100 parts by mass of a mixture of a polyorganosiloxane obtained by polymerization by using an alkali metal hydroxide as a polymerization catalyst and by neutralization, and adding a curing agent, and
   (B) 100 to 1000 ppm of an ionic substance containing an anion and a cation, and being a bis(trifluoromethanesulfonyl)-imide anion as the anion.

2. The heat-curable silicone rubber composition according to claim 1, wherein the alkali metal polymerization catalyst used in polymerization of the component (A) is an alkali metal hydroxide catalyst selected from cesium hydroxide, rubidium hydroxide, potassium hydroxide, and sodium hydroxide.

3. The heat-curable silicone rubber composition according to claim 1, wherein the cation of the component (B) is an imidazolium-based cation, a pyrrolidinium-based cation, a pyridinium-based cation, an ammonium-based cation, or a lithium cation.

4. The heat curable silicone rubber composition according to claim 1, wherein the component (B) is selected from 1-butyl-1-methylpyrrolidinium.bis-(trifluoromethanesulfonyl)imide, 1-methyl-1-propylpyrrolidinium.bis(trifluoromethanesulfonyl)imide, 3-methyl-1-propylpyridinium.bis(trifluoromethanesulfonyl)imide, N-butyl-e-methylpyridinium.bis(trifluoromethanesulfonyl)imide, 1-methyl-1-propylpyridinium.bis(trifluoromethanesulfonyl)imide, diallyldimethylammonium.bis(trifluoromethanesulfonyl)imide, methyltrioctylammonium.bis(trifluoromethanesulfonyl)imide, 1-butyl-3-methylimidazolium.bis(trifluoromethanesulfonyl)imide, 1,2-dimethyl-3-propylimidazolium.bis(trifluoromethanesulfonyl)-imide, 1-ethyl-3-methylimidazolium.bis(trifluoromethane-sulfonyl)imide, 1-vinylimidazolium.bis(trifluoromethane-sulfonyl)imide, 1-allylimidazolium.bis(trifluoromethane-sulfonyl)imide, 1-allyl-3-methylimidazolium.bis(trifluoromethanesulfonyl)imide, and lithium.bis(trifluoromethanesulfonyl)imide.

5. A method for manufacturing the heat-curable silicone rubber composition according to claim 1, the method comprising the steps of:
   mixing the ionic substance of the component (B) and a filler containing a reinforcing silica to thereby carry the ionic substance on the filler, and then
   mixing the resultant mixture with the component (A).

6. An antistatic silicone rubber cured product obtained by curing the silicone rubber composition according to claim 1.

7. A heat-curable silicone rubber composition comprising:
   (A) 100 parts by mass of a mixture of a polyorganosiloxane obtained by polymerization by using an alkali metal hydroxide as a polymerization catalyst and by neutralization, and adding a curing agent, and
   (B) 100 to 1000 ppm of an ionic substance containing an anion and a cation, and being a bis(trifluoromethanesulfonyl)-imide anion as the anion,
   wherein the component (A) further contains a reinforcing silica.

8. The heat-curable silicone rubber composition according to claim 7, wherein the alkali metal polymerization catalyst used in polymerization of the component (A) is an alkali metal hydroxide catalyst selected from cesium hydroxide, rubidium hydroxide, potassium hydroxide, and sodium hydroxide.

9. The heat-curable silicone rubber composition according to claim 7, wherein the cation of the component (B) is an imidazolium-based cation, a pyrrolidinium-based cation, a pyridinium-based cation, an ammonium-based cation, or a lithium cation.

10. The heat-curable silicone rubber composition according to claim 7, wherein the component (B) is selected from 1-butyl-1-methylpyrrolidinium.bis(trifluoromethylsulfonyl)imide, 1-methyl-1-propylpyrrolidinium.bis(trifluoromethanesulfonyl)-imide, 3-methyl-1-propylpyridinium.bis(trifluoromethane-sulfonyl)imide, N-butyl-3-methylpyridinium.bis(trifluoromethane-sulfonyl)imide, 1-methyl-1-propylpyridnium bis(trifluoromethane-sulfonyl)imide, diallyldimethylammonium.bis(trifluoromethane-sulfonyl)imide, methyltrioctylammonium.bis(trifluoromethane-sulfonyl)imide, 1-butyl-3-methylimidazolium.bis(trifluoro-methanesulfonyl)imide, 1,2-dimethyl-3-propylimiadzolium.bis-(trifluoromethanesulfonyl)imide, 1-ethyl-3-methylimidazolium.bis(trifluoromethanesulfonyl)imide, 1-vinylimidazolium.bis(trifluoromethanesulfonyl)imide, 1-allylimidazolium.bis(trifluoromethanesulfonyl)imide, 1-allyl-3-methylimidazolium.bis(trifluoromethanesulfonyl)imide, and lithium.bis(trifluoromethanesulfonyl)imide.

11. A method for manufacturing the heat-curable silicone rubber composition according to claim 7, the method comprising the steps of:
   mixing the ionic substance of the component (B) and a filler containing a reinforcing silica to thereby carry the ionic substance on the filler, and then
   mixing the resultant mixture with the component (A).

12. An antistatic silicone rubber cured product obtained by curing the silicone rubber composition according to claim 7.

* * * * *